United States Patent [19]

Weaver

[11] 4,346,647
[45] Aug. 31, 1982

[54] PISTON CONSTRUCTION FOR RECIPROCATING PUMPS

[75] Inventor: Joe T. Weaver, Midland, Tex.

[73] Assignee: Weaver Manufacturing Company, Midland, Tex.

[21] Appl. No.: 236,624

[22] Filed: Feb. 20, 1981

[51] Int. Cl.³ .............................................. F16J 9/12
[52] U.S. Cl. ...................................... 92/243; 92/253; 277/188 A
[58] Field of Search .................... 92/243, 244, 253; 277/188 A, 188 R, 152

[56] References Cited

U.S. PATENT DOCUMENTS

| | | | |
|---|---|---|---|
| 1,955,157 | 4/1934 | Wayne | 92/244 |
| 2,063,724 | 12/1936 | Cater | 277/188 R |
| 2,656,229 | 10/1953 | Stillwagon | 92/253 |
| 2,757,994 | 8/1956 | Snyder | 277/188 R |
| 2,808,302 | 10/1957 | Bowerman | 92/244 |
| 2,819,131 | 2/1958 | Lankford | 92/244 |
| 4,053,166 | 10/1977 | Domkowski | 277/152 |
| 4,143,586 | 3/1979 | Zitting | 277/188 A |
| 4,281,590 | 8/1981 | Weaver | 277/188 A |

FOREIGN PATENT DOCUMENTS 670628  9/1963  Canada .................................. 92/244

*Primary Examiner*—Abraham Hershkovitz
*Assistant Examiner*—Ali Tangoren
*Attorney, Agent, or Firm*—Gunn, Lee & Jackson

[57] ABSTRACT

A pump piston construction for mud pumps and the like incorporating a resilient sealing member that establishes a pressure enhanced seal between the piston and pump cylinder. A bearing and anti-extrusion member composed of a relatively hard and flexible friction resistant plastic material is structurally interrelated with and may also be bonded to the sealing member. The anti-extrusion member is supported by an annular rigid flange of a piston hub about which both the sealing member and anti-extrusion member are received. The anti-extrusion member serves as a bearing to minimize wear of the piston and cylinder and is yielded radially outwardly responsive to fluid pressure transmitted through the resilient sealing member and functions to prevent extrusion of any of the resilient material of the sealing member into the space between the piston and cylinder.

16 Claims, 4 Drawing Figures

PISTON CONSTRUCTION FOR RECIPROCATING PUMPS

FIELD OF THE INVENTION

This invention relates generally to reciprocating pumps, such as mud pumps and the like, and more particularly, relates to a piston construction that is received by the piston rod of the pump and functions to establish a seal between the piston and pump cylinder during operation. More specifically, the present invention concerns a particular piston construction that is provided with an anti-extrusion capability to prevent the resilient sealing material of the piston from being extruded into the space between the piston and pump cylinder even under circumstances where the pump cylinder might have become worn to a considerable degree.

BACKGROUND OF THE INVENTION

Although the present invention is quite well adapted to reciprocating pumps other than mud pumps for circulating drilling mud within a well being drilled, for purposes of simplicity, the invention is discussed particularly as it relates to pistons for mud pumps.

Piston and cylinders for mud pumps are susceptible to a high degree of wear during use because the drilling mud being pumped contains a suspension of particulate, such as drill cuttings, that can be quite erosive. Moreover, mud pumps typically operate at high pressures due to the necessity for pumping the drilling mud through perhaps several thousand feet of drill stem where it emerges at relatively high velocity at the drill bit in order to provide lubrication and cooling for the bit and to provide a vehicle for removal of drill cuttings from the earth formation being drilled. The erosive character of the drilling fluid medium typically causes wear of both the piston and pump cylinder but the pump cylinder, when worn, can develop a condition that causes rapid deterioration of the piston construction. As the metal pump cylinder becomes worn due to erosion, the annular space between the piston and the cylinder wall will increase substantially. As fluid pressure is applied to the elastomeric sealing portion of the piston, the elastomeric material can be forced or extruded into this annular space. When this occurs, the extruded portion of the elastomeric material is very quickly and easily damaged by the cutting or tearing action that occurs as the extruded portion of the material is moved linearly along the cylinder wall. Any transverse movement of the piston during such linear movement can cause the extruded elastomeric sealing material of the piston to be pinched between the metal portions of the piston and the cylinder wall, thus developing a cutting or pinching action that quickly deteriorates the elastomeric material immediately adjacent the annular metal portion of the piston hub.

When a piston becomes worn due to pinching or accelerated deterioration of the elastomeric material, the annular metal portion of the piston hub structure can contact and cause further accelerated wear of the pump cylinder during use. Under the circumstance where accelerated wear is occuring it is necessary that the mud pump be taken out of service for sufficient period of time that the piston and pump cylinder can be replaced. Obviously, when the mud pump systems of a drilling rig are out of service for repair, unless supplemental or auxiliary mud pumps are provided, it is necessary to discontinue the drilling operation until such time as appropriate repairs are made. In order to facilitate optimum drilling operations, it is of course appropriate that mud pump systems be provided that will function for extended periods of time without requiring replacement of the pistons or cylinders. It is also desirable that a pump piston construction be provided that has a bearing capability that will prevent unnecessary wear of the metal pump cylinder of the mud pump even under high pressure service conditions.

Accordingly, it is a feature of the present invention to provide a novel pump cylinder construction incorporating an elastomeric sealing member and also incorporating an anti-extrusion member that effectively prevents extrusion of the elastomeric sealing material into the annular space between the piston and the pump cylinder.

It is also a feature of the present invention to provide a novel piston construction for reciprocating pumps incorporating an elastomeric sealing member that functions to transmit fluid pressure and cause pressure induced radial expansion of an anti-extrusion member that functions to minimize the annular spacing between the piston construction and the cylinder wall.

Another feature of the present invention contemplates the provision of a novel piston construction for reciprocating pumps wherein an anti-extrusion member is provided that also provides a bearing capability to minimize wear of the pump cylinder during use.

A further feature of the present invention concerns a novel pump piston construction incorporating an annular sealing element composed of elastomeric material and an anti-extrusion member composed of a relatively hard but yieldable plastic material, the outer portion of which is yielded radially outwardly responsive to fluid pressure transmitted through the elastomeric material and bearing upon an internal surface thereof.

It is also a feature of the present invention to provide a novel pump piston construction incorporating an elastomeric sealing member and an annular anti-extrusion member with the sealing member and anti-extrusion member being of mating structurally interrelated construction.

It is an even further feature of the present invention to provide a novel pump piston construction wherein the elastomeric sealing portion of the piston construction is bonded to an anti-extrusion member and the hub structure of the piston, thereby allowing the piston be replaceable as a unit.

It is also a feature of the present invention to provide piston construction wherein an annular elastomeric sealing member and an annular anti-extrusion member composed of heat resistant plastic material are bonded together and the sealing member and anti-extrusion member are also bonded to the hub portion of the piston construction.

It is another feature of this invention to provide a novel pump piston construction incorporating an annular sealing member and an anti-extrusion member that are structurally interlocked with the metal hub portion of the piston.

Other and further objects, advantages and features of the present invention will become apparent to one skilled in the art upon consideration of this entire disclosure. The form of the invention, which will now be described in detail, illustrates the general principles of the invention, but it is to be understood that this detailed description is not to be taken as limiting the scope of the present invention.

SUMMARY OF THE INVENTION

In accordance with the present invention, a pump piston construction is provided that may be of the duplex type adapted to induce pumping force in both directions of movement, or of the simplex type adapted to induce pumping force in only one direction of piston movement. In either case, the piston construction comprises a hub structure defining at least one elongated tubular portion and further defining an annular abutment structure that may be in the form of an annular flange or shoulder positioned in substantially normal relation to the tubular portion of the hub. In order to establish a seal between the piston and the cylinder of the pump within which the piston is received, an annular sealing element that is composed of any suitable elastomeric material is positioned about the tubular portion of the hub. To prevent the elastomeric material of the sealing element from being extruded into the annular space between the piston and the internal wall of the cylinder, a relatively hard annular anti-extrusion member is positioned about the tubular portion of the piston hub and is interposed between the annular sealing member and the abutment flange or shoulder. The anti-extrusion member defines a surface configuration that establishes mating interfitting relation with an annular surface configuration of the elastomeric sealing member. The elastomeric sealing member is positively interconnected with anti-extrusion member by heat and pressure enhanced bonding in the presence of an appropriate adhesive material. The anti-extrusion member is also formed to define an annular abutment surface that establishes mating engagement with the abutment member of the hub.

To provide an interlocking relationship between the hub structure, the anti-extrusion member and the elastomeric sealing element, the hub is formed to define an annular locking groove adjacent each side of the abutment member of the hub within which is received an inner peripheral portion of the anti-extrusion member. This mechanically interlocked relationship between the hub and the anti-extrusion member enhances the sealed relationship between the hub, the anti-extrusion member and sealing member as well as providing structural interrelation that prevents inadvertent disassembly of the sealing member from the hub. To facilitate positioning of the anti-extrusion member within the locking groove, end portions of the hub are of tapered, frusto-conical configuration, defining cam surfaces that radially expand the anti-extrusion member within the elastic limits of the material of which it is composed. As the anti-extrusion member contracts within the locking groove, it establishes tight fitting engagement with the surfaces defining the locking groove.

In order to prevent any tendency of the elastomeric material of the sealing element to be extruded into the annular space between the piston and the internal cylindrical wall of the pump cylinder as high pressure is brought to bear against the sealing element, the anti-extrusion member is provided with the capability of expanding radially under the influence of pressure transmitted through the sealing member to achieve substantial closure of the gap or annular space that might otherwise exist between the pump cylinder and piston. The anti-extrusion member is provided with an annular axially extending flange portion that defines the radially outer portion thereof. Due to the yieldable nature of the plastic material from which the anti-extrusion member is composed, the axially extending flange portion will yield and move radially outwardly upon being pressure energized by fluid pressure transmitted through the elastomeric material that is disposed radially inwardly of this axially extending flange portion. Even under circumstances where the pump cylinder might have become worn to a considerable degree, defining a substantial annular groove or gap between the piston and cylinder, the anti-extrusion member is capable of substantial radial yielding and will effectively prevent extrusion of the elastomeric material of the sealing element into the annular gap or space. The outer peripheral portion of the anti-extrusion member also provides a bearing function due to the friction resistant characteristics of the material from which it is composed and serves to protect the internal wall of the cylinder from excessive wear as the piston is reciprocated within the pump cylinder. The anti-extrusion member further prevents contact between the metal hub structure of the piston and the internal wall of the cylinder, thus preventing any wear that might otherwise be induced by metal-to-metal contact as the piston reciprocates within the cylinder.

BRIEF DESCRIPTION OF THE DRAWINGS

For a better understanding of the invention, as well as the various objects and further features thereof, reference is made to the following detailed description to be read in conjunction with the accompanying drawings wherein.

DETAILED DESCRIPTION OF PREFERRED EMBODIMENTS

The pump cylinders or liners of mud pumps for pumping well drilling fluid are susceptible to considerable wear as the erosive drilling fluid medium or drilling mud is pumped under high pressure conditions by the reciprocating pistons of the pump. The pump cylinders, which are also referred to as liners, are composed of relatively wear resistant metal material in order to retard erosion thereof during pumping of the drilling mud. Nevertheless, mud pump cylinders are susceptible to a considerable degree of wear and, in many cases, the internal dimension of the cylinders increases substantially within a relatively short period of time due to erosion. When this occurs, the elastomeric sealing members of the piston, which are subjected to high pressure conditions, tend to conform to the internal structural configuration defined by the pump and the cylinder. For this reason, when a relatively large annular space or gap is developed between the pump piston and cylinder wall due to wear of the pump piston, the elastomeric material of the sealing element tends to become extruded into this annular space or gap and the extruded material is easily torn, pinched or otherwise deteriorated quite rapidly as the piston reciprocates. Failure of a pump piston will typically occur within a relatively short period of time when the pump cylinder has become worn.

Another wear accelerating factor results when the metal hub portion of the pump piston comes into contact with the cylinder wall during pumping reciprocation. When this ocurs, the metal-to-metal sliding contact between the piston hub and cylinder wall can cause severe scoring of the cylinder wall and typically result in the necessity for replacement of the pump cylinder or liner. Obviously, it is desirable to extend the service life of the pump cylinder and piston in order to thereby insure against the necessity for shutting down the drilling operation in order to accomplish servicing of the mud pump. For this reason, many drilling rigs incorporate a substantial number of mud pumps in order to insure backup pumping capability in the event a mud pump should become unserviceable prior to scheduled servicing operations. Providing backup mud pumps is, of course, quite expensive although quite practical, considering the high costs of drilling operations.

Figure 1:
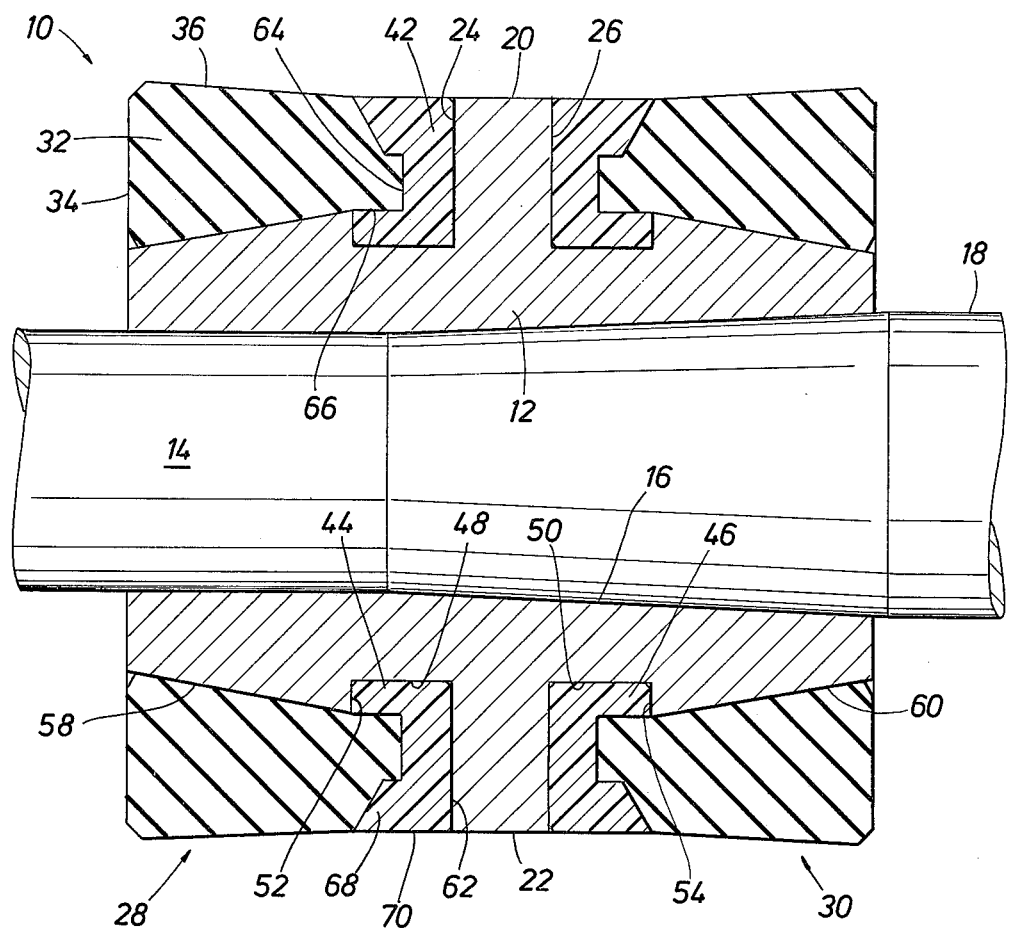
FIG. 1 is a sectional view of a reciprocating pump piston constructed in accordance with the present invention and being mounted on a pump piston rod, only a portion of which is shown.

Referring now to the drawings and particularly to FIG. 1, there is provided a piston construction, illustrated generally at 10, that provides protection against extrusion of the elastomeric material of the piston as well as providing bearing protection for the internal wall surface of the cylinder during pumping operations. The piston construction 10 includes a generally cylindrical hub portion 12 that is formed internally to define a passage 14 in order to provide appropriate connection of the piston to the piston shaft 18 of the reciprocating mud pump. As shown, the passage 14 of the piston hub is defined in part by an internal tapered bore 16 that mates with the external tapered portion of the piston shaft 18. This particular character of connection between the piston and pump cylinder is not to be taken as limiting of the invention, however, it being obvious that other commercially available means for establishing connection between a pump shaft and the hub portion of a piston may be utilized within the spirit and scope of the present invention. The piston construction may also be of the duplex type as shown in FIG. 1 where pumping activity takes place in both directions of piston movement or, in the alternative, may be utilized in simplex type pumping systems were pumping takes place in only one direction of piston movement. As illustrated in FIG. 1, the hub member 12 also incorporates an annular abutment flange portion 20 defining a rather short cylindrical surface 22 that is disposed in spaced relation with the internal cylindrical wall of a pump cylinder when installed therein. The abutment flange defines opposed annular abutment surfces 24 and 26 that provide structural support for the piston seal assemblies as the piston is driven against the fluid within the cylinder due to linear movement of the piston during a pumping stroke.

The piston construction of FIG. 1 is a duplex type system incorporating a pair of seal assemblies generally indicated at 28 and 30, which assemblies are substantially identical and establish appropriate sealing between the piston and cylinder wall depending upon the direction of piston movement within the pump cylinder. For purposes of simplicity, only one of the seal assemblies is discussed herein.

Figure 2:
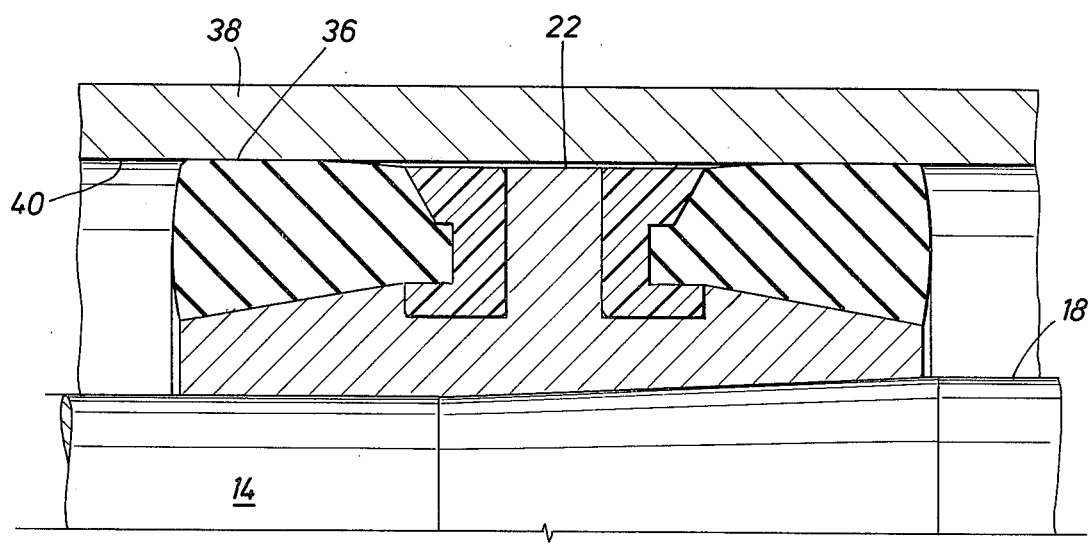
FIG. 2 is a partial sectional view of the piston construction of FIG. 1, illustrating the configuration and structural relationship thereof as installed within a pump cylinder.

It is desirable that each of the seal assemblies of the piston have the capability of establishing a fluid tight seal with the internal wall of the cylinder at all pressure conditions. Accordingly, it is desirable that an elastomeric type material, such as rubber or any one of a number of suitable rubber-like materials, be utilized in the seal assembly in order to insure the development and maintenance of the seal at low pressure conditions. Accordingly, the annular seal member 28 incorporates an annular body 32 of elastomeric material that is formed to define a combination low pressure and high pressure sealing member 34. The sealing member 34 incorporates an annular outer peripheral tapered surface 36 that, in the uncompressed condition thereof as shown in FIG. 1, extends radially outwardly beyond the peripheral surface 22 of the annular abutment flange 20. As the piston 10 is inserted within a cylinder 38 as shown in FIG. 2, the outwardly extending tapered surface is yielded radially inwardly through its engagement with the internal cylindrical wall or surface 40 of the cylinder and assumes the general configuration illustrated in FIG. 2. As further shown in FIG. 2, the internal surface 40 of the cylinder 38 is illustrated in new, unworn condition and the peripheral surface 22 of the abutment flange 20 is shown in spaced relation with the internal surface 40 of the cylinder. Deformation of the outer tapered surface portion 36 of the sealing member 34 in the manner shown in FIG. 2 establishes an initial seal between the sealing member and the cylindrical surface 40 of the cylinder.

Figure 3:
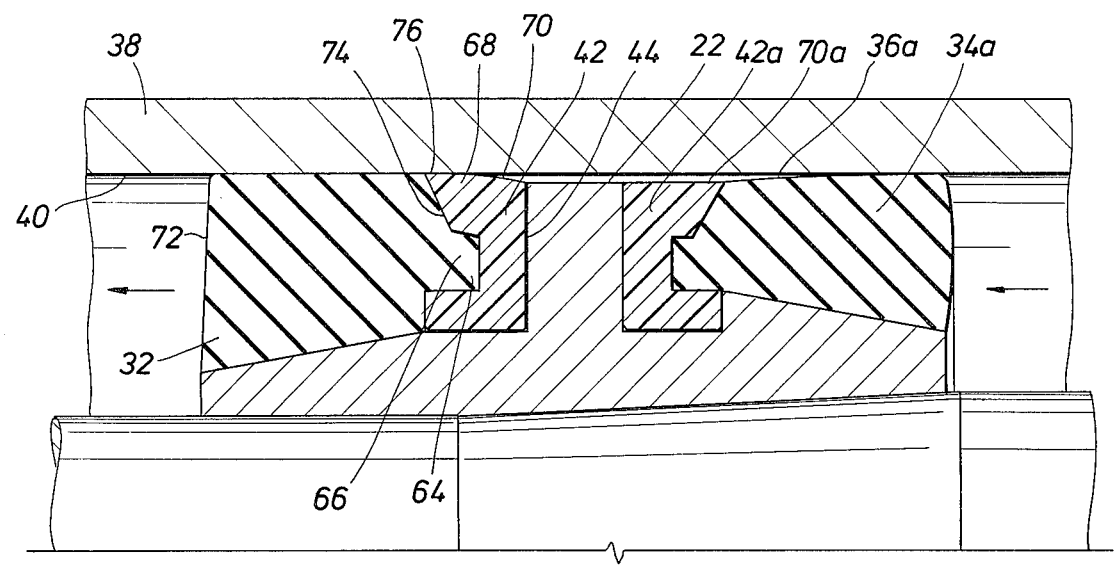
FIG. 3 is a partial sectional view of the pump cylinder construction of FIGS. 1 and 2, illustrating the internal cylindrical wall of the cylinder as being substantially worn and illustrating pressure induced radial expansion of one of the sealing members as the piston is moved in the direction of the arrow.

As the internal surface 40 of the cylinder becomes worn due to the erosive effects of pumping particulate laden drilling mud, the annular space existing between the peripheral surface 22 of the abutment member and the internal surface 40 of the cylinder will increase as shown in FIG. 3. When this increased annular space develops, under ordinary circumstances the elastomeric material of the body 32 will tend to be extruded into this annular space by pressure being transmitted through the elastomeric material of the sealing member. The extruded elastomeric material is susceptible of being torn as it is moved along the inside surface of the cylinder during a pumping stroke and is also susceptible of being pinched or otherwise deteriorated in this extruded condition. It is, of course, desirable to prevent extrusion of the elastomeric sealing member even under circumstances where the pump cylinder has become substantially worn during use and a large peripheral space or annular exists between the piston and cylinder wall such as shown in FIG. 3. In accordance with the present invention, an annular anti-extrusion member 42 is interposed between the elastomeric seat member and the annular abutment flange. The anti-extrusion member 42 is generally "C" shaped as viewed in half cross-section and is constructed of a relatively hard plastic material that is yieldable to some extent within its elastic limits as will be explained hereinbelow for the purpose of facilitating installation of the anti-extrusion member and for the purpose of minimizing or closing the annular space or gap that might otherwise result in extrusion of the elastomeric sealing member. The anti-extrusion member is also composed of a material that is friction resistant in order to provide a bearing function that minimizes wear of the internal surface of the pump cylinder. One suitable material from which the anti-extrusion member may be composed may take the form of a polyester material, such as that manufactured by E. I. DuPont de Nemours & Co. and sold under the registered trademark HYTREL.

The hub 12 of the piston is formed to define a pair of annular locking grooves 44 and 46 that circumscribe the hub immediately adjacent the abutment flange 20. The locking grooves are each formed by generally cylindrical surfaces 48 and 50 that are intersected by radial surfaces 52 and 54 and by the radially disposed planar abutment surfaces 24 and 26. The inner peripheral portion of each of the anti-extrusion members is of generally rectangular cross-sectional configuration and is received in close fitting engagement within respective ones of the locking grooves. This structural arrangement establishes a mechanically interlocked relation between the metal hub structure and the non-metal anti-extrusion members.

The hub 12 is formed to define tapered or generally frusto-conical surfaces 58 and 60 that function as cam surfaces to achieve radial expansion of the anti-extrusion members as they are assembled in interlocked relation with the hub structure. Anti-extrusion members of the configuration illustrated in FIG. 1 are forced inwardly toward the respective locking grooves 44 and 46. The tapered surfaces 58 and 60 react in cam-like manner with the inner peripheries of the anti-extrusion members, inducing radial expansion of the anti-extrusion members. This radial expansion is within the elastic limits or elastic memory of the material from which the anti-extrusion members are composed. As soon as the anti-extrusion members have been moved sufficiently to clear the radial shoulder surfaces 52 and 54, thus positioning the inner peripheral portions of the anti-extrusion members in registry with the respective locking grooves, the elastic memory of the material will cause the anti-extrusion member to contract. This activity forces the inner peripheral portions of the anti-extrusion members into positively seated and interlocked relation with the locking grooves of the hub.

The anti-extrusion member is formed to define an annular abutment surface 62 having mating, fully supported engagement with the annular abutment surface 24 of the abutment flange 20. The anti-extrusion member 42 is also formed to define an intermediate annular groove 64 that receives an annular projecting portion 66 of the elastomeric sealing member 34. Forming the intermediate annular groove 64 within the anti-extrusion member defines an outer radial flange portion 60 that extends axially toward the sealing member 34. The outer peripheral surface 70 is in coextensive relation or positioned slightly radially outwardly in comparison to the peripheral surface 22 of the abutment flange 20. The outer peripheral surfaces 36 of the sealing members 34 are tapered outwardly from the anti-extrusion member to the end portions of the piston, thus causing the end portions of the piston to have engagement with the inner surface 40 of the liner. By such construction of the sealing members, the metal flange 20 of the hub structure is prevented from engagement with the metal cylindrical surface 40 of the pump cylinder, thus preventing any wear of the cylinder due to metal-to-metal contact.

The anti-extrusion characteristic of member 42 is developed responsive to transmission of pressure through the elastomeric material of the sealing member 34, which pressure is caused to bear upon the inner periphery of the annular flange portion 68 in addition to the other surfaces of the anti-extrusion member. Fluid pressure is transmitted through the elastomeric material into the annular intermediate groove 64 and causes radially outward displacement or yielding of the flange portion 68 of the anti-extrusion member. As shown in FIG. 3, piston member 10 is moving in the direction of the arrow during a pumping stroke and, thus, a pressure condition develops against the sealing element 34 as the fluid within the cylinder is forced through the outlet valve of the pump into the flow line that supplies the drilling system with pressurized drilling fluid. The pressure that develops against the sealing element is transmitted into the annular groove 64 through the annular projecting portion 66 of the sealing member. Thus, the pressure developed during the pumping stroke is transmitted to the contacting surface areas of the anti-extrusion member 42. Since the anti-extrusion member is firmly supported by the hub body 14 and by the abutment surface 24 the inner peripheral portion will not yield. Only the unsupported portion of the anti-extrusion member, i.e. the axially extending flange 68 will be yielded radially outwardly, thus inducing the peripheral surface 70 thereof to move into close proximity or engagement with the cylindrical surface 40 of the pump cylinder 38. As shown in FIG. 3, the flange portion 68 of the anti-extrusion member 42 will yield from the FIG. 2 position thereof to the position or configuration illustrated in FIG. 3. When this occurs, little or no annular space or gap exists between the anti-extrusion member and the cylinder wall. Thus the elastomeric material of the sealing member will not be subject to extrusion and the consequent wear, damage or deterioration that would otherwise occur as the result of such extrusion. Moreover, the outer surface 70 of the anti-extrusion member functions as a bearing due to the antifriction characteristics of the polyester material thereof to further enhance the service life of the pump cylinder by restricting erosive wear thereof.

With the piston member 10 moving in the direction of the arrow as shown in FIG. 3, the seat member at the right portion of the figure will be relaxed to the uncompressed condition thereof. The annular tapered surface portion 36a of the sealing member 34a will bear against the cylindrical surface 40 of the cylinder due to the inherent configuration thereof. The anti-extrusion member 42a, however, will be in its relaxed condition and peripheral surface 70a will be positioned in substantially spaced relation with the internal surface 40 of the cylinder.

As shown at the left side portion of FIG. 3, the pressure of the fluid being pumped will bear upon the end face 72 of the sealing member 32. Due to the elastic nature of the sealing mass, the pressure of the fluid will be transmitted through the sealing member, causing it to become deformed and establish greater surface contact with the cylinder wall 40. Thus, fluid pressure is also conducted into the annular groove 64 defined by the anti-extrusion member 42. The outer peripheral portion of the anti-extrusion member forms an annular tapered end surface 74 that intersects the cylindrical outer surfaces 70 in acute angular relation and cooperates therewith to define an annular lip having a rather sharp edge 76. As pressure induced force is applied to the tapered surface 74, the outer flange portion 68 of the anti-extrusion member is yielded radially outwardly, thus closing or substantially closing the annular space between the anti-extrusion member and cylinder wall. By miminizing or eliminating this annular space, any tendency for the elastomeric material of the sealing member to be pressure extruded into this annular space is eliminated. By virtue of the tapered nature of the outer flange 68 of the anti-extrusion member, the varying sectional modulus of the outer flange provides it with the capability of responding to a wide range of pumping pressures. When the outer surface 70 of the flange 68 contacts the cylindrical surface 40 of the pump liner, the friction resistant characteristics of the material from which the anti-extrusion member is composed establishes a bearing function to prevent excessive wear of the pump liner. Moreover, the anti-extrusion member also prevents contact between the abutment flange 20 and the pump liner, thereby further enhancing the service life of the piston assembly and pump liner.

At the end of the pumping stroke illustrated in FIG. 3, the piston will reverse its movement and seat assembly 30 will then become active to achieve pumping compression during opposite movement of the piston. In this case, the anti-extrusion member 42a will be pressure energized to the configuration of anti-extrusion member 42 as shown in FIG. 3, thus compensating for the wear of the pump cylinder and insuring that the elastomeric material of sealing member 34a does not become subject to pressure induced extrusion.

It is desirable that the annular sealing and anti-extrusion members be structurally interrelated in order to insure proper functioning of the anti-extrusion capability. Accordingly, the sealing member and anti-extrusion member are permanently bonded in assembly. Where rubber or other rubber-like elastomeric materials are utilized to form the sealing member, a bond between the sealing member and the anti-extrusion member, where formed of DuPont HYTREL, may be established in the presence of a bonding agent of the Whittaker Corporation referred to by trade designations AB-1244 and XAB-894, sold under the registered trademark THIXON. This bond is established under the influence of heat within the range of about 300° F. to about 350° F. and under compression. The compression bond becomes completely cured during a period of between approximately 50 minutes to approximately 70 minutes. It is desirable to also establish a bond between the metal hub structure, the anti-extrusion member and the sealing member. This character of bond is accomplished by subjecting the DuPont HYTREL material to sand blasting and then coating the sand blasted area with a primer referred to as Chemlock AP134 primer, which is manufactured by the Lord Corporation. The metal surfaces to be bonded are grit blasted and are then cleaned with methylethylketone. Following cleaning, the metal surfaces are then coated with the Chemlock AP134 primer, followed by a coating of Chemlock adhesive material, such as is referred to by trade designation 7000-7203 of the Lord Corporation. This bond is also achieved within the temperature compression and curing time indicated above in connection with establishment of the bond between the rubber material and the DuPont HYTREL material.

Although specific materials are indicated above, such is intended only as illustrative of one of the possible embodiments of the present invention and is not to be taken as limiting the scope of this invention. It is obvious that other materials, temperature ranges, compression loads, adhesives, primers, etc. may be utilized within the spirit and scope of the present invention.

Figure 4:
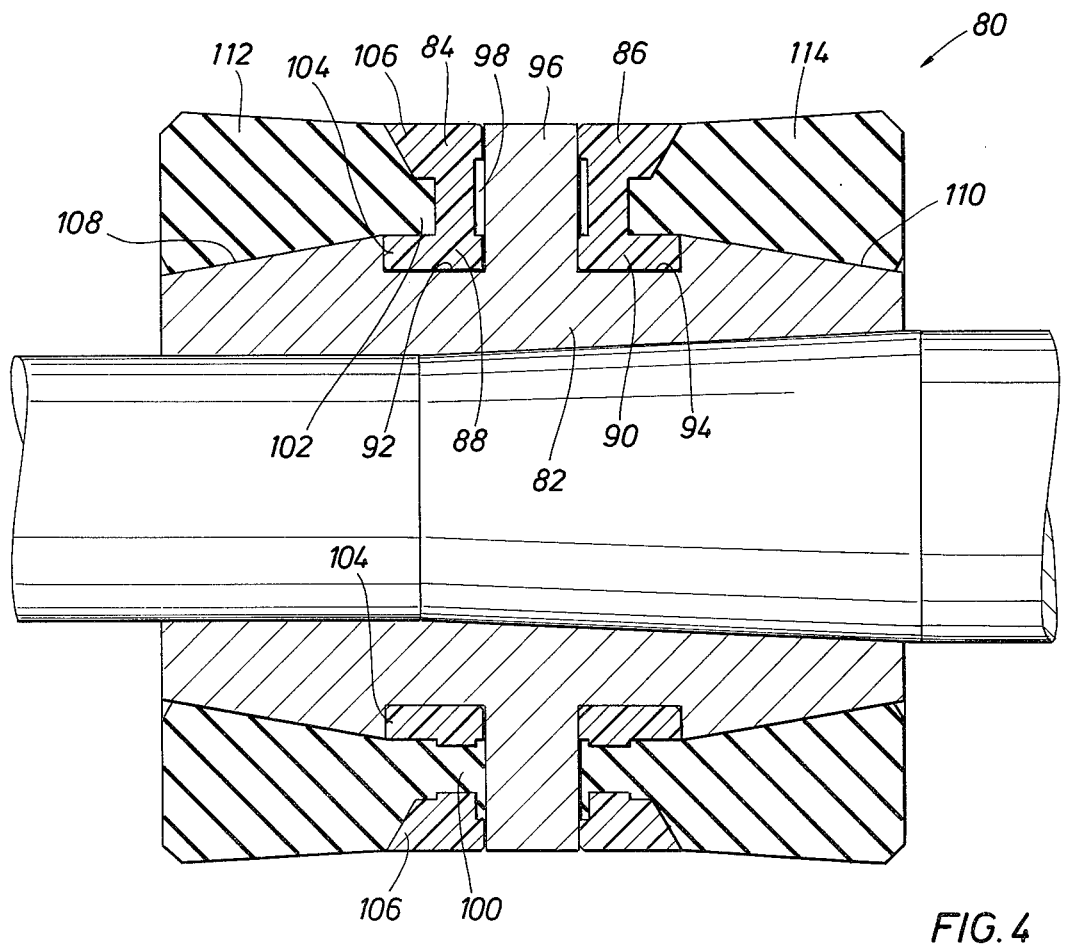
FIG. 4 is a sectional view of a piston construction for reciprocating piston pumps, representing a modified embodiment of the present invention and showing the piston construction prior to installation within a pump cylinder.

It may also be appropriate to establish a mechanically interlocked relationship between the anti-extrusion members and sealing members of the piston assembly. As illustrated in FIG. 4, a piston construction representing a modified embodiment of this invention includes elastomeric sealing material which is mechanically interlocked with the respective anti-extrusion members thereof. As shown in FIG. 4, the piston illustrated generally at 80 incorporates a hub 82 that is generally identical to the configuration of the hub 12 shown in FIG. 1. A pair of anti-extrusion members are employed as shown at 84 and 86 having inner peripheral portions 88 and 90 that are received within annular locking grooves 92 and 94 that are defined by the hub structure. For purposes of simplicity, only one of the sealing members and anti-extrusion members is discussed, the structures of these components being essentially identical as shown in FIG. 4. It should be borne in mind, however, that the mechanical structures of the sealing members and anti-extrusion members on each side of the abutment flange 96 need not be identical but may vary somewhat depending on the desired characteristics of pumping mechanism.

The anti-extrusion member 84 is formed to define an intermediate web portion forming an annular recess 98 that is located intermediate the inner and outer peripheral portions of the web portion of the anti-extrusion member. As shown in the lower portion of FIG. 4, the anti-extrusion member is formed to define a plurality of connecting openings or passages 100 that interconnect the annular recess 98 with an annular groove 102 that is defined between the inner and outer peripheral flanges 104 and 106 of the anti-extrusion member.

The piston assembly 80 is typically manufactured by positioning the anti-extrusion members 84 and 86 in mechanically interlocked assembly within the respective locking grooves 92 and 94 of the hub structure. This is accomplished in the same manner as described above in conjunction with hub 12 and the anti-extrusion members 42. The anti-extrusion members are forcibly expanded by the interacting relationship of the inner peripheries thereof and the annular tapered cam surfaces 108 and 110 of the hub structure. After the anti-extrusion members have been positioned within the locking grooves, this assembly is placed within a mold and the elastomeric sealing material forming the mass of the sealing elements 112 and 114 is molded to the hub structure and the structure of the anti-extrusion members under application of heat and pressure. Bonding of the elastomeric material of the sealing members and to the hub structure and to the structure of the anti-extrusion members is also accomplished at this time. As shown in the lower portion of FIG. 4, the elastomeric material of the sealing members 112 and 114 extends through the apertures or passages 100 and fills the recess 98, thus establishing a mechanically interlocked relationship with the respective anti-extrusion member. The structure of the anti-extrusion members and the sealing members is otherwise substantially identical as compared to the structure set forth in FIGS. 1-3. From the operational standpoint, the piston assembly of FIG. 4 functions in the same manner as described above in conjunction with FIGS. 1-3. As the piston is moved during a pumping stroke within its pump liner, the pressure of the fluid being pumped will be transmitted through the elastomeric sealing member into the annular groove 102. Logically, this pressure will also be transmitted through the apertures or passages 100, thus pressurizing the entire body of elastomeric material. Pressurization of the elastomeric material within the passages 100 and within the annular recess or groove 98 has little operational effect on the activities of either the sealing member or the anti-extrusion member. Upon being pressurized, the elastomeric sealing member and the anti-extrusion member will conform to the configuration illustrated in FIG. 3 thus providing optimum pumping capability and providing protection for the piston and pump liner due to the friction resistant nature of the material from which the anti-extrusion member is composed. Moreover, the anti-extrusion member prevents extrusion of the elastomeric sealing material within the gap or annular space between the piston and the pump liner even under circumstances where the pump liner has become worn. The piston construction, whether that of FIGS. 1-3 or that shown in FIG. 4, provides exceptional service life and protects the pump liner from excessive wear. The invention is, therefore, capable of providing the various features, objects and advantages set forth herein.

While the present invention has been described in terms of specific embodiment thereof, it is evident that many alterations, modifications and variations will be apparent to those skilled in the art in light of the disclosure above. Accordingly, it is intended to embrace all such alterations, modifications and variations that fall within the spirit and scope of this invention as defined by the following claims:

What is claimed is:

1. A pump piston construction for a reciprocating type pump having a pump cylinder, said pump piston comprising:

a one piece piston hub adapted to be reciprocated within said pump cylinder by a piston rod, said hub defining a cylindrical abutment portion of slightly smaller diameter than an unworn cylinder of said pump and forming at least one annular abutment surface, said hub further defining an elongated annular portion of smaller diameter as compared to the diameter of said cylindrical abutment portion, said hub defining an internal passage extending through said elongated annular portion and said abutment portion and receiving said piston rod therein, said elongated annular portion defining locking groove means in the outer peripheral portions thereof, said locking means being located on opposed sides of said cylindrical abutment portion, said elongated annular portion further defining seal guide surface means defining a small dimension at the ends of said hub and a larger dimension at said locking groove means;

an annular piston seal ring composed of elastomeric material and being positioned about a portion of said hub, said piston seal ring defining an inner peripheral portion having mating relation with said elongated annular portion and being in intimate assembly with at least a portion of said elongated annular portion, said piston seal ring futher defining a tapered outer surface portion that is yielded radially inwardly upon insertion into said pump cylinder, said piston seal ring also defining an intermediate annular axially projecting portion;

an annular anti-extrusion member being positioned about a portion of said hub and being interposed between and in intimate assembly with said piston seal ring and said abutment surface, said anti-extrusion member having an outer generally yieldable axially extending flange portion formed and being positionable in justaposed relation with said pump cylinder, said yieldable flange portion of said anti-extrusion member being located radially outwardly of said axially projecting portion of said piston seal ring and being yieldable radially outwardly into bearing contact with said pump cylinder responsive to pressure transmission through said axially projecting portion of said piston seal ring and preventing pressure induced extrusion of the elastomeric material of said piston seal ring in the annular space between said piston hub and cylinder, said anti-extrusion member defining an inner peripheral locking portion of smaller internal dimension as compared to said larger dimension of said seal guide surface means and being formed of material having sufficient elasticity to expand and pass over said tapered guide surface and to retract to the original dimension thereof, said inner peripheral locking portion being received in mechanically interlocked relation within said locking groove means, said anti-extrusion member further defining an annular intermediate groove between said outer flange portion and said inner peripheral locking portion, said intermediate axially extending portion of said piston seal ring being received in mating relation within said annular intermediate groove.

2. The pump piston construction recited in claim 1, wherein:

said anti-extrusion member defines an annular web portion positioned in intimate abutting relation with said abutment portion of said hub and positioned in intimately received relation about said elongated annular portion of said hub; said outer generally cylindrical yieldable portion being formed integrally with said body portion and interfitting in mating relation with said annular piston seal, said inner peripheral portion of said anti-extrusion member being formed integrally therewith and defining axially extending annular locking flange means being received in close fitting relation within said locking groove means, said yieldable outer flange and said locking flange being disposed in spaced relation and defining said annular intermediate groove.

3. A pump piston construction recited in claim 1, wherein:

said outer flange portion of said anti-extrusion member defines an annular bearing surface for bearing contact with said pump cylinder.

4. A pump piston construction recited in claim 1, wherein:

said outer flange portion of said anti-extrusion member defines an annular tapered surface oriented in acute angular relation with said outer cylindrical surface and cooperating therewith to define an annular tapered lip terminating at an annular edge said annular tapered lip being more flexible at said annular edge than at portions thereof having greater thickness than the thickness of said annular edge.

5. A pump piston construction recited in claim 1, wherein:

said annular tapered surface means being of smaller dimension at an end of said hub than the internal dimension of said anti-extrusion member.

6. A pump piston construction recited in claim 5, wherein:

said locking groove means is of annular form and is defined by a cylindrical surface interposed between annular planar surfaces, one of said annular planar surfaces being defined by said abutment.

7. A pump piston construction recited in claim 1, wherein:
said anti-extrusion member is formed to define a plurality of openings; and
said body of elastomeric sealing material filling said openings and establishing a mechanically interlocked relation between said seal ring and said anti-extrusion member.

8. A pump piston construction recited in claim 1, wherein said anti-extrusion member includes:
an intermediate annular web portion having said yieldable axially extending flange portion and said locking portion formed integrally therewith, said intermediate annular web portion being formed to define a plurality of openings extending therethrough; and
portions of said elastomeric material of said sealing ring extending through said openings and mechanically interlocking said seal ring and said anti-extrusion member in assembly.

9. A pump piston construction recited in claim 8, wherein:
said anti-extrusion member is formed to define an annular recess facing said abutment surface of said piston hub and being in communication with said plurality of openings of said web portion thereof; and
said portions of elastomeric sealing material of said seal ring also filling said annular recess and being in contact with said abutment surface.

10. A pump piston construction recited in claim 1, including:
bonding material securing said piston seal ring to said hub and to said anti-extrusion member and securing said anti-extrusion member to said abutment surface and locking groove means of said hub.

11. A pump piston construction for a reciprocating type pump having a pump cylinder, said pump piston comprising:
a one piece metal piston hub adapted to be reciprocated within said pump cylinder by a piston rod, said hub defining a cylindrical abutment portion of slightly smaller diameter than an unworn cylinder of said pump and forming at least one annular abutment surface, said hub further defining an elongated annular portion of smaller diameter as compared to the diameter of said cylindrical abutment portion, said elongated annular portion defining an internal passage receiving said piston rod therein and defining an external tapered surface having its smallest dimension at one end of said hub, said elongated annular portion defining at least one generally cylindrical locking groove in the outer portion thereof, said locking groove being located adjacent said cylindrical abutment and intersecting said external tapered surface of said hub;
an annular piston seal ring composed of elastomeric material and being positioned about and in intimate assembly with said tapered portion of said hub, said piston seal ring further defining a tapered outer surface portion having its largest dimension at said one end of said hub, said tapered outer surface portion being yielded radially inwardly upon insertion into said pump cylinder, said piston seal ring also defining an intermediate annular axially projecting portion;
an annular anti-extrusion member being positioned about a portion of said hub and being interposed between and in intimate assembly with said piston seal ring and said abutment surface, said anti-extrusion member having an outer generally tapered yieldable axially extending flange portion defining an outer peripheral flexible lip and being positionable in justaposed relation with said pump cylinder, said yieldable flange portion of said anti-extrusion member being located radially outwardly of said axially projecting portion of said piston seal ring and being yieldable radially outwardly into bearing contact with said pump cylinder responsive to pressure transmission through said axially projecting portion of said piston seal ring and preventing pressure induced extrusion of the elastomeric material of said piston seal ring in the annular space between said piston hub and cylinder, said anti-extrusion member defining an inner peripheral locking portion being received in mechanically interlocked relation within said locking groove, said anti-extrusion member being composed of a material having sufficient elasticity to expand upon passing over said tapered surface and to retract substantially to the original dimension thereof upon reaching said locking groove, said anti-extrusion member further defining an annular intermediate groove between said outer flange portion and said inner peripheral locking portion, said intermediate axially extending portion of said piston seal ring being received in mating relation within said annular intermediate groove.

12. A pump piston construction recited in claim 11, wherein:
said locking groove means is of annular form and is defined by a cylindrical surface interposed between annular planar surfaces, one of said annular planar surfaces being defined by said abutment.

13. A pump piston construction recited in claim 11, wherein:
said anti-extrusion member is formed to define a plurality of openings; and
said body of elastomeric sealing material filling said openings and establishing a mechanically interlocked relation between said seal ring and said anti-extrusion member.

14. A pump piston construction recited in claim 11, wherein said anti-extrusion member includes:
an intermediate annular web portion having said yieldable axially extending flange portion and said locking portion formed integrally therewith, said intermediate annular web portion being formed to define a plurality of openings extending therethrough; and
portions of said elastomeric material of said sealing ring extending through said openings and mechanically interlocking said seal ring and said anti-extrusion member in assembly.

15. A pump piston construction recited in claim 14, wherein:
said anti-extrusion member is formed to define an annular recess facing said abutment surface of said piston hub and being in communication with said plurality of openings of said web portion thereof; and said portions of elastomeric sealing material of said seal ring also filling said annular recess and being in contact with said abutment surface.

16. A pump piston construction recited in claim 11, wherein:

bonding material securing said piston seal ring to said hub and to said anti-extrusion member and securing said anti-extrusion member to said abutment surface and locking groove means of said hub.

* * * * *